United States Patent
Marinier et al.

(10) Patent No.: US 11,083,009 B2
(45) Date of Patent: *Aug. 3, 2021

(54) METHOD AND APPARATUS FOR SENDING UPLINK CONTROL INFORMATION FOR MULTI-RADIO ACCESS TECHNOLOGY OPERATION

(71) Applicant: INTERDIGITAL PATENT HOLDINGS, INC., Wilmington, DE (US)

(72) Inventors: Paul Marinier, Brossard (CA); Diana Pani, Montreal (CA); Ghyslain Pelletier, Montreal (CA); Marian Rudolf, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/748,394

(22) Filed: Jan. 21, 2020

(65) Prior Publication Data
US 2020/0236705 A1 Jul. 23, 2020

Related U.S. Application Data

(63) Continuation of application No. 16/450,488, filed on Jun. 24, 2019, now Pat. No. 10,542,560, which is a (Continued)

(51) Int. Cl.
*H04W 74/00* (2009.01)
*H04W 88/06* (2009.01)
(Continued)

(52) U.S. Cl.
CPC ........ *H04W 74/004* (2013.01); *H04B 7/0626* (2013.01); *H04B 7/0632* (2013.01);
(Continued)

(58) Field of Classification Search
CPC ............................. H04W 74/004; H04W 88/06
(Continued)

(56) References Cited

U.S. PATENT DOCUMENTS 6,778,509 B1   8/2004   Ravishankar et al.
8,345,630 B2   1/2013   Zou et al.
(Continued)

FOREIGN PATENT DOCUMENTS

| WO | 01/22759 | 3/2001 |
|---|---|---|
| WO | 08/017693 | 2/2008 |
| WO | 11/123531 | 10/2011 |

OTHER PUBLICATIONS

Ericsson et al., "Spectrum migration from HSPA to LTE," 3GPP TSG-RAN WG1 Meeting #64, R1-111089, Taipei, Taiwan (Feb. 21-25, 2011).

(Continued)

*Primary Examiner* — Angel T Brockman
(74) *Attorney, Agent, or Firm* — Volpe Koenig

(57) ABSTRACT

A method and apparatus for sending uplink control information by a multi-mode wireless transmit/receive unit (WTRU) capable of operating on multiple component carriers of a plurality of radio access technologies (RATs) for multi-RAT operation are disclosed. The WTRU may generate uplink control information (UCI) pertaining to a first RAT and a second RAT, wherein the UCI may include a first plurality of hybrid automatic repeat request acknowledgements (HARQ-ACKs) pertaining to a plurality of downlink (DL) transmissions of the first RAT and a second plurality of HARQ-ACKs pertaining to a plurality of DL transmissions of the second RAT. The WTRU may multiplex at least part of the generated UCI pertaining to the first RAT and at least (Continued)

part of the generated UCI pertaining to the second RAT onto a physical channel on a component carrier of the second RAT.

14 Claims, 6 Drawing Sheets

Related U.S. Application Data continuation of application No. 15/809,668, filed on Nov. 10, 2017, now Pat. No. 10,356,813, which is a continuation of application No. 15/213,860, filed on Jul. 19, 2016, now abandoned, which is a continuation of application No. 14/512,829, filed on Oct. 13, 2014, now Pat. No. 9,438,401, which is a continuation of application No. 13/413,922, filed on Mar. 7, 2012, now Pat. No. 8,861,461.

(60) Provisional application No. 61/450,039, filed on Mar. 7, 2011.

(51) Int. Cl.
| | |
|---|---|
| H04B 7/06 | (2006.01) |
| H04L 1/18 | (2006.01) |
| H04L 5/00 | (2006.01) |
| H04W 72/04 | (2009.01) |
| H04L 1/00 | (2006.01) |
| H04L 1/16 | (2006.01) |
| H04W 12/10 | (2021.01) |
| H04W 24/10 | (2009.01) |
| H04W 72/12 | (2009.01) |

(52) U.S. Cl.
CPC ......... *H04B 7/0639* (2013.01); *H04L 1/1861* (2013.01); *H04L 5/0007* (2013.01); *H04L 5/0053* (2013.01); *H04W 72/0413* (2013.01); *H04W 72/0453* (2013.01); *H04W 74/006* (2013.01); *H04W 88/06* (2013.01); *H04L 1/0031* (2013.01); *H04L 1/0072* (2013.01); *H04L 1/1671* (2013.01); *H04L 5/0057* (2013.01); *H04L 2001/0092* (2013.01); *H04W 12/10* (2013.01); *H04W 24/10* (2013.01); *H04W 72/12* (2013.01)

(58) Field of Classification Search
USPC .......................................................... 370/329
See application file for complete search history.

(56) References Cited

U.S. PATENT DOCUMENTS

| | | | |
|---|---|---|---|
| 9,271,290 | B2 | 2/2016 | Pelletier et al. |
| 10,542,560 | B2 * | 1/2020 | Mariner ............... H04W 88/06 |
| 2010/0062800 | A1 | 3/2010 | Gupta et al. |
| 2010/0322176 | A1 | 12/2010 | Chen et al. |
| 2011/0044218 | A1 | 2/2011 | Kaur et al. |
| 2011/0205981 | A1 | 8/2011 | Koo et al. |
| 2012/0093073 | A1 | 4/2012 | Lunttila et al. |

OTHER PUBLICATIONS

Ericsson, "Impact of Carrier Aggregation on the L2 protocol architecture for LTE Rel-10," 3GPP TSG-RAN WG2 #66, R2-092957 (May 4-8, 2009).
Huawei, "Migration scenarios and possible aggregation between HSPA and LTE," 3GPP TSG RAN WG1 #64, R1-111126, Taipei, Taiwan (Feb. 21-25, 2011).
Nokia Siemens Networks et al., "Aggregating HSDPA and LTE carriers," 3GPP TSG-RAN WG1 Meeting #64, R1-111060, Taipei, Taiwan (Feb. 21-25, 2011).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.3.0 (Sep. 2010).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.0.0 (Dec. 2010).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.4.0 (Dec. 2011).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).
Third Generation Partnership Project, "Technical Specification Group Radio Access Network; Evolved Universal Terrestrial Radio Access (E-UTRA); Physical layer procedures (Release 10)," 3GPP TS 36.213 V10.0.1 (Dec. 2010).
Third Generation Partnership Project, "Technical Specification Group Radio Access Network; Evolved Universal Terrestrial Radio Access (E-UTRA); Physical layer procedures (Release 10)," 3GPP TS 36.213 V10.4.0 (Dec. 2011).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.9.0 (Jun. 2010).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.11.0 (Dec. 2011).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.3.0 (Jun. 2010).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.5.0 (Dec. 2011).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.0.0 (Dec. 2010).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.4.0 (Dec. 2011).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.12.0 (Dec. 2010).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.16.0 (Dec. 2011).
Third Generation Partnership Project, "Technical Specification Group Radio Access Network; Evolved Universal Terrestrial Radio Access

(56) References Cited

OTHER PUBLICATIONS (E-UTRA); Radio Resource Control (RRC); Protocol specification (Release 9)," 3GPP TS 36.331 V9.5.0 (Dec. 2010).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.9.0 (Dec. 2010).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.0.0 (Dec. 2010).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.4.0 (Dec. 2011).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.2.0 (Dec. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.6.0 (Dec. 2011).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.0.0 (Dec. 2011).

ZTE, "Consideration on the aggregation of LTE and HSPA," 3GPP TSG-RAN WG1 Meeting #64, R1-111173, Taipei, Taiwan (Feb. 21-25, 2011).

\* cited by examiner

METHOD AND APPARATUS FOR SENDING UPLINK CONTROL INFORMATION FOR MULTI-RADIO ACCESS TECHNOLOGY OPERATION

CROSS REFERENCE TO RELATED APPLICATIONS

This application is a continuation of U.S. patent application Ser. No. 16/450,488 filed Jun. 24, 2019, which issued as U.S. Pat. No. 10,542,560 on Jan. 21, 2020, which is a continuation of U.S. patent application Ser. No. 15/809,668 filed Nov. 10, 2017, which issued as U.S. Pat. No. 10,356,813 on Jul. 16, 2019, which is a continuation of U.S. patent application Ser. No. 15/213,860 filed Jul. 19, 2016, which is a continuation of U.S. patent application Ser. No. 14/512,829 filed Oct. 13, 2014, which issued as U.S. Pat. No. 9,438,401 on Sep. 6, 2016, which is a continuation of U.S. patent application Ser. No. 13/413,922 filed Mar. 7, 2012, which issued as U.S. Pat. No. 8,861,461 on Oct. 14, 2014, which claims the benefit of U.S. Provisional Application No. 61/450,039 filed Mar. 7, 2011, the contents of which are hereby incorporated by reference herein.

BACKGROUND

The demand for improved network coverage and increased capacity and bandwidth for both voice and data services in wireless communication systems has led to continuous developments of radio access technologies (RATs) including, but not limited to, Global System for Mobile communication (GSM), Wideband Channel Division Multiple Access (WCDMA), High Speed Packet Access (HSPA) including High Speed Downlink Packet Access (HSDPA) and High Speed Uplink Packet Access (HSUPA) with their respective multicarrier counterparts, Long Term Evolution (LTE) including support for carrier aggregation in Release 10 (R10), IEEE 802.11b/a/g/n, IEEE 802.16a/e, IEEE 802.20, cdma2000 1x, cdma2000 EV-DO.

The Third Generation Partnership Project (3GPP) WCDMA Release 8 (R8) introduced support for simultaneous use of two HSDPA downlink carriers (2C-HSDPA) to improve bandwidth usage with frequency diversity and resource pooling. 3GPP Release 9 (R9) introduced support for multiple-input multiple-output (MIMO) to the multicarrier downlink WCDMA. 3GPP R9 also introduced support for two HSUPA uplink carriers. 3GPP R10 introduced support for up to 4 downlink carriers (4C-HSDPA). This may be increased to up to 8 downlink carriers (8C-HSDPA) in 3GPP Release 11 (R11).

3GPP LTE R10 introduced support for simultaneous transmission and/or reception using the radio resources of a plurality of component carriers between a network node (i.e., evolved NodeB (eNB)) and a mobile terminal (i.e., wireless transmit/receive unit (WTRU)) within the same transmission interval. R10 HSPA with MIMO offers downlink peak data rates of 42 Mbps, while R10 multicarrier HSPA may further increase the peak rate by introducing support for up to four downlink component carriers. LTE R8/9 offers up to 100 Mbps in the single carrier downlink, while LTE R10 with (intra-RAT) carrier aggregation may further increase the peak rate by combining transmission resources of up to 5 component carriers.

Spectrum is a costly resource and not all frequency bands may be available to all operators. While many operators may offer support for both HSPA and LTE services, carrier aggregation may be limited to 2-3 component carriers per RAT for a given operator. In addition, legacy deployments may be maintained for a foreseeable future while LTE is being deployed. This may lead to a situation where operators may see periods of underutilization of radio resources/spectrum and capacity in one of their RATs.

SUMMARY

A method and apparatus for sending uplink control information (UCI) by a multi-mode WTRU capable of operating on multiple component carriers of a plurality of RATs for multi-RAT operation are disclosed. The multi-mode WTRU may generate UCI pertaining to a first RAT and send at least part of the UCI via a feedback channel on a component carrier of a second RAT. The first RAT may be LTE and the second RAT may be HSPA, or vice versa. The UCI of the RATs may be multiplexed onto a carrier of any one of the RATs. The UCI bits for a pair of, or multiple, serving cells may be jointly encoded.

A method and apparatus for sending uplink control information by a multi-mode wireless transmit/receive unit (WTRU) capable of operating on multiple component carriers of a plurality of radio access technologies (RATs) for multi-RAT operation are disclosed. The WTRU may generate uplink control information (UCI) pertaining to a first RAT and a second RAT, wherein the UCI may include a first plurality of hybrid automatic repeat request acknowledgements (HARQ-ACKs) pertaining to a plurality of downlink (DL) transmissions of the first RAT and a second plurality of HARQ-ACKs pertaining to a plurality of DL transmissions of the second RAT. The WTRU may multiplex at least part of the generated UCI pertaining to the first RAT and at least part of the generated UCI pertaining to the second RAT onto a physical channel on a component carrier of the second RAT. The WTRU may send the physical channel via the second RAT to a base station. The UCI may be prioritized over another UCI in accordance with a priority rule. The first RAT may operate on a first frequency and the second RAT may operate on a second frequency. The second frequency may be a lower frequency than the first frequency.

BRIEF DESCRIPTION OF THE DRAWINGS

A more detailed understanding may be had from the following description, given by way of example in conjunction with the accompanying drawings wherein.

DETAILED DESCRIPTION

Figure 1A:
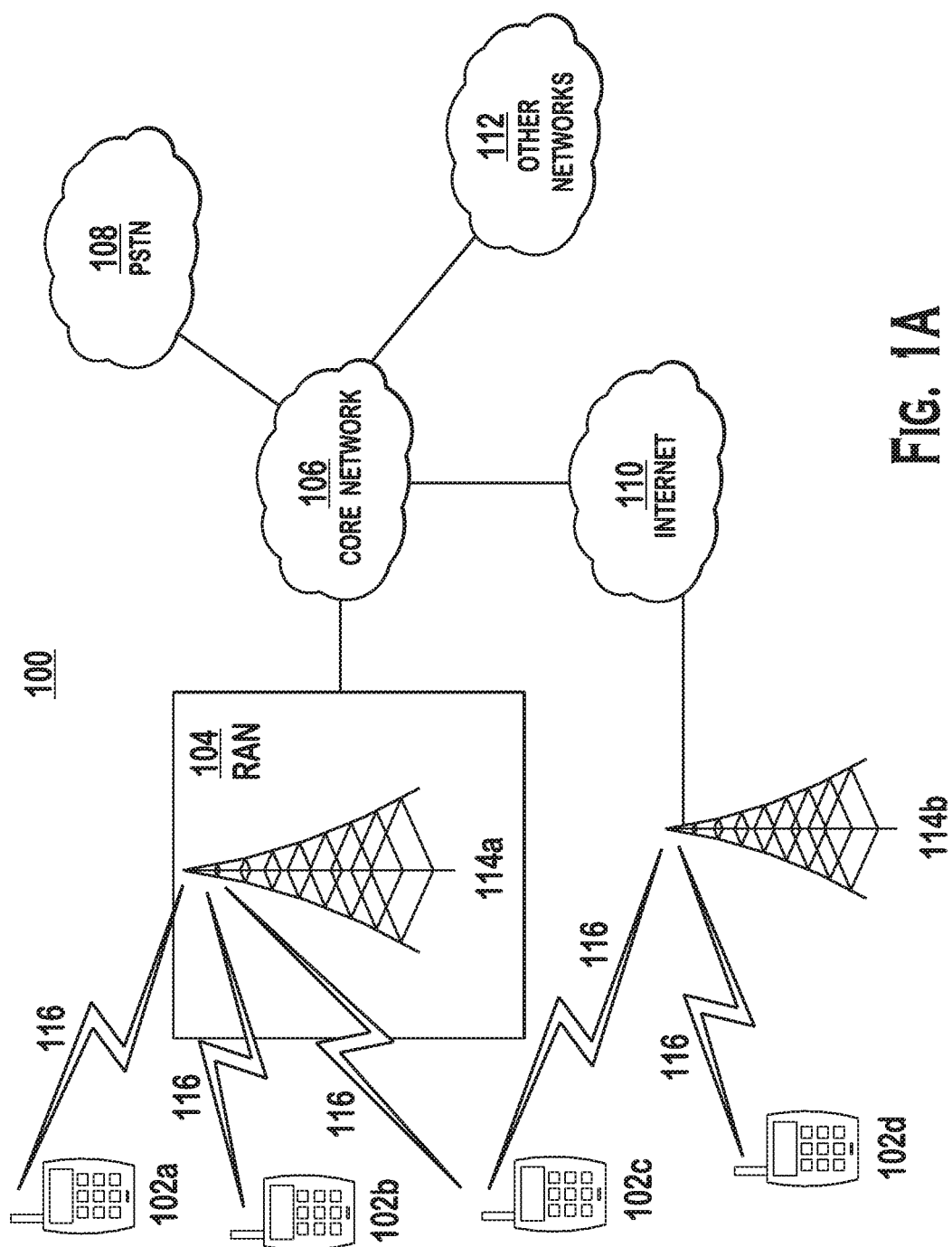
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
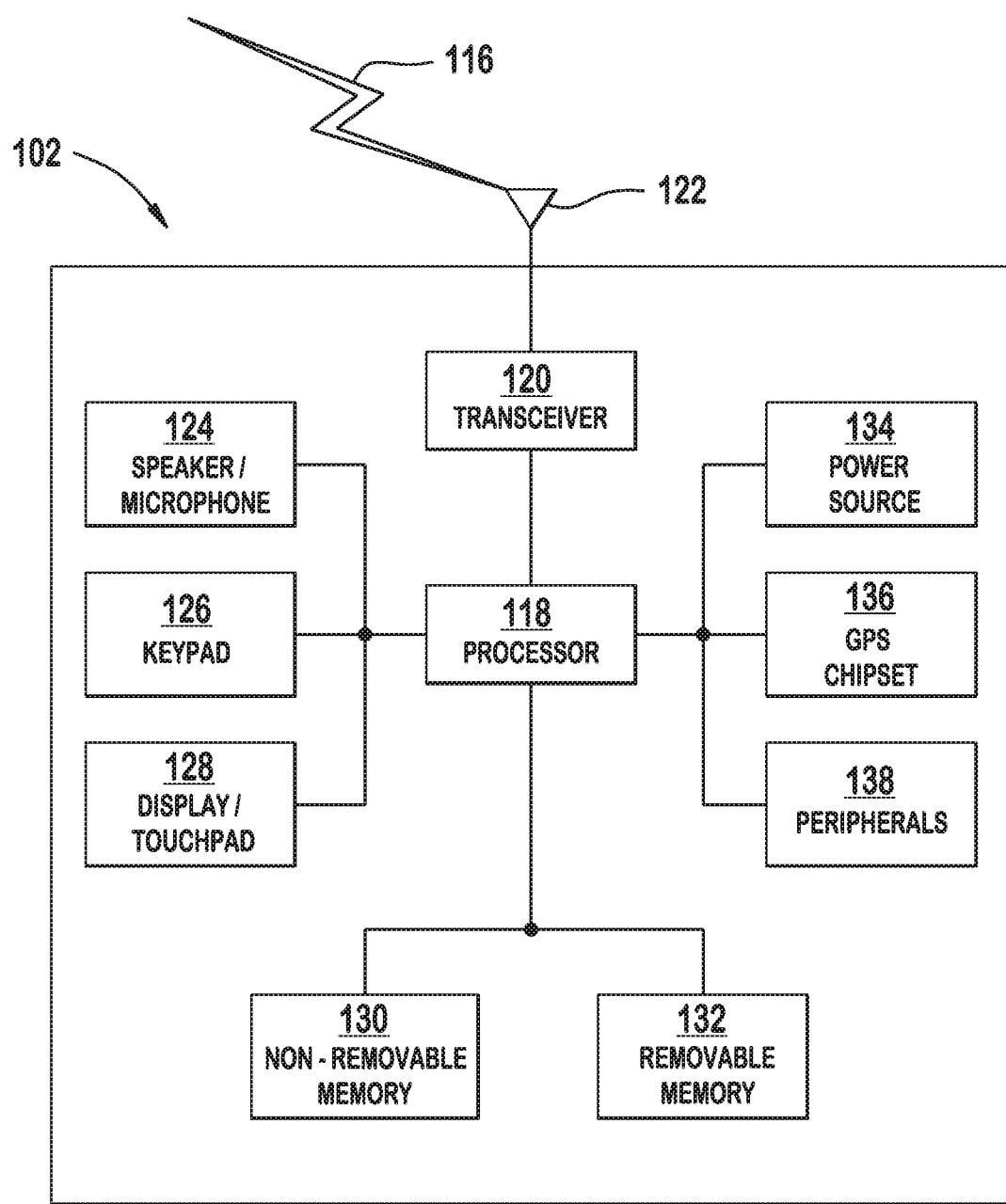
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
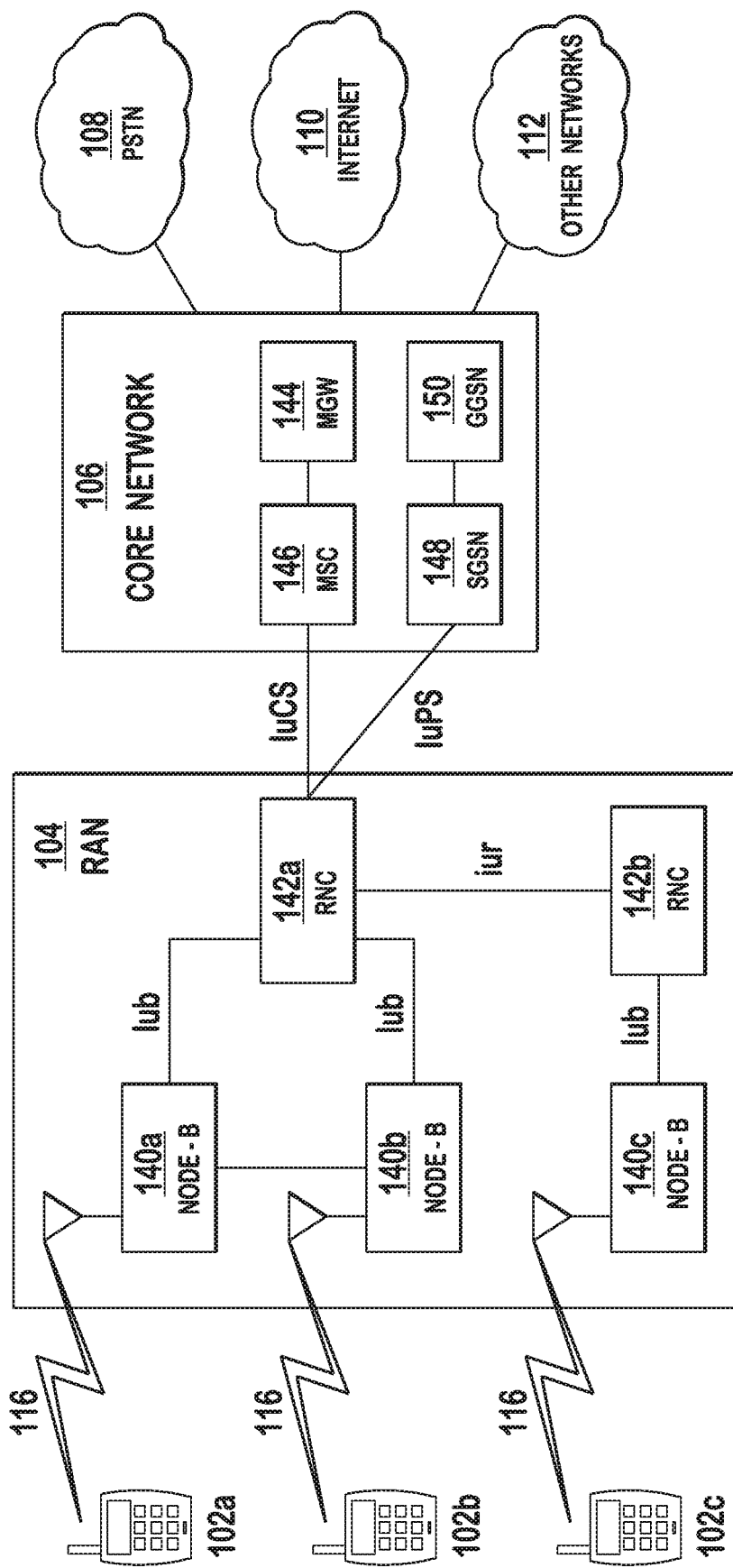
FIG. 1C is a system diagram of an example UMTS radio access network and an example UMTS core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iur interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
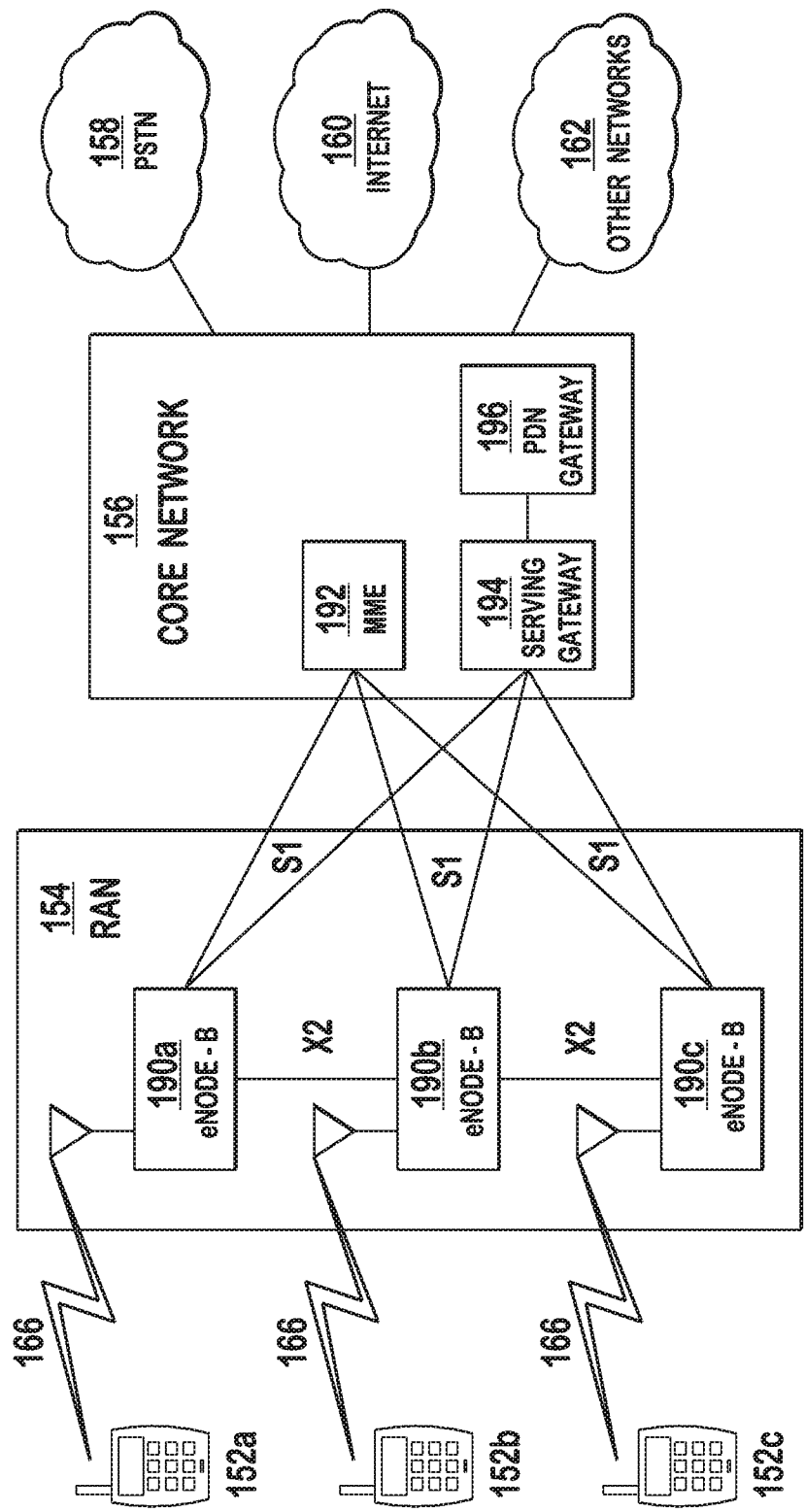
FIG. 1D is a system diagram of an example LTE RAN and an example LTE core network that may be used within the communications system illustrated in FIG. 1A.

FIG. 1D is a system diagram of an example LTE RAN 154 and an example LTE core network 156 that may be used within the communications system illustrated in FIG. 1A. The RAN 154 employs an E-UTRA radio technology to communicate with the WTRUs 152a, 152b, 152c over the air interface 166. The RAN 154 may also be in communication with the core network 156.

The RAN 154 may include eNode-Bs 190a, 190b, 190c, though it will be appreciated that the RAN 154 may include any number of eNode-Bs while remaining consistent with an embodiment. The eNode-Bs 190a, 190b, 190c may each include one or more transceivers for communicating with the WTRUs 152a, 152b, 152c over the air interface 166. In one embodiment, the eNode-Bs 190a, 190b, 190c may implement MIMO technology. Thus, the eNode-B 190a, for example, may use multiple antennas to transmit wireless signals to, and receive wireless signals from, the WTRU 152a.

Each of the eNode-Bs 190a, 190b, 190c may be associated with a particular cell (not shown) and may be configured to handle radio resource management decisions, handover decisions, scheduling of users in the uplink and/or downlink, and the like. As shown in FIG. 1D, the eNode-Bs 190a, 190b, 190c may communicate with one another over an X2 interface.

The core network 156 shown in FIG. 1D may include a mobility management gateway (MME) 192, a serving gateway 194, and a packet data network (PDN) gateway 196. While each of the foregoing elements are depicted as part of the core network 156, it will be appreciated that any one of these elements may be owned and/or operated by an entity other than the core network operator.

The MME 192 may be connected to each of the eNode-Bs 192a, 192b, 192c in the RAN 154 via an S1 interface and may serve as a control node. For example, the MME 192 may be responsible for authenticating users of the WTRUs 152a, 152b, 152c, bearer activation/deactivation, selecting a particular serving gateway during an initial attach of the WTRUs 152a, 152b, 152c, and the like. The MME 192 may also provide a control plane function for switching between the RAN 154 and other RANs (not shown) that employ other radio technologies, such as GSM or WCDMA.

The serving gateway 194 may be connected to each of the eNode Bs 190a, 190b, 190c in the RAN 154 via the S1 interface. The serving gateway 194 may generally route and forward user data packets to/from the WTRUs 152a, 152b, 152c. The serving gateway 194 may also perform other functions, such as anchoring user planes during inter-eNode B handovers, triggering paging when downlink data is available for the WTRUs 152a, 152b, 152c, managing and storing contexts of the WTRUs 152a, 152b, 152c, and the like.

The serving gateway 194 may also be connected to the PDN gateway 196, which may provide the WTRUs 152a, 152b, 152c with access to packet-switched networks, such as the Internet 160, to facilitate communications between the WTRUs 152a, 152b, 152c and IP-enabled devices.

The core network 156 may facilitate communications with other networks. For example, the core network 156 may provide the WTRUs 152a, 152b, 152c with access to circuit-switched networks, such as the PSTN 158, to facilitate communications between the WTRUs 152a, 152b, 152c and traditional land-line communications devices. For example, the core network 156 may include, or may communicate with, an IP gateway (e.g., an IP multimedia subsystem (IMS) server) that serves as an interface between the core network 156 and the PSTN 158. In addition, the core network 156 may provide the WTRUs 152a, 152b, 152c with access to the networks 162, which may include other wired or wireless networks that are owned and/or operated by other service providers.

When referred to hereafter, the term "component carrier (CC)" means, without loss of generality, a frequency on which a WTRU operates. For example, a WTRU may receive transmissions on a downlink (DL) CC, which may comprise a plurality of DL physical channels, and the WTRU may perform transmissions on an uplink (UL) CC, which may comprise a plurality of UL physical channels. Hereafter, the terms "component carrier," "frequency," and "carrier" will be used interchangeably. Hereafter, the terms "HARQ A/N," "HARQ ACK/NACK," and "HARQ-ACK" will be used interchangeably.

The LTE downlink physical channels include, but are not limited to, a Physical Control Format Indicator Channel (PCFICH), a Physical Hybrid ARQ Indicator Channel (PHICH), a Physical Data Control Channel (PDCCH), a Physical Multicast data Channel (PMCH), and a Physical Data Shared Channel (PDSCH). On the PCFICH, the WTRU receives control data indicating the size of the control region of the DL CC. On the PHICH, the WTRU receives control data indicating HARQ ACK/NACK feedback for a previous uplink transmission. On the PDCCH, the WTRU receives downlink control information (DCI) messages, for example, used for the purpose of scheduling of downlink and uplink resources. On the PDSCH, the WTRU receives user and/or control data.

The LTE uplink physical channels include, but are not limited to, a Physical Uplink Control Channel (PUCCH), and a Physical Uplink Shared Channel (PUSCH). On the PUSCH, the WTRU transmits user and/or control data. On the PUCCH, and in some case on the PUSCH, the WTRU transmits uplink control information (such as channel state information (CSI) including channel quality indicator (CQI), precoding matrix indicator (PMI), rank indication (RI), or scheduling request (SR), and/or HARQ ACK/NACK feedback). On an UL CC, the WTRU may also be allocated dedicated resources for transmission of Sounding and Reference Signals (SRS).

For HSDPA, a shared channel, (i.e., the High-Speed Downlink Shared Channel (HS-DSCH)), is used for downlink transmission. The HS-DSCH is a transport channel on which the WTRU receives user data and/or control signaling from logical channels such as a Dedicated Transport Channel (DTCH), a Dedicated Control Channel (DCCH), a Common Control Channel (CCCH), or a Broadcast Control Channel (BCCH). The WTRU receives the HS-DSCH on the High-Speed Physical Downlink Shared Channel (HS-PDSCH). The WTRU receives on the High-Speed Shared Control Channel (HS-SCCH) downlink control signaling for scheduling the HS-PDSCH transmissions, (e.g., a transport format including a channelization code, a modulation scheme, and a transport block size), as well as other types of control signaling, (e.g., discontinuous reception (DRX)/discontinuous transmission (DTX) activation/deactivation and/or activation/deactivation commands for additional HSPA cells). The WTRU transmits uplink feedback control information related to the HS-PDSCH transmissions and/or HS-SCCH orders on the High-Speed Dedicated Physical Control Channel (HS-DPCCH). The feedback includes HARQ feedback, CQI, and precoding control indication (PCI) if the WTRU is configured for MIMO operation. Power control commands may be received by the WTRU on a dedicated physical channel (DPCH) or a fractional DPCH (F-DPCH).

For HSUPA, an Enhanced Dedicated Channel (E-DCH) is used. The E-DCH is mapped on an E-DCH Dedicated Physical Data Channel (E-DPDCH). There may be zero, one, or more E-DPDCH(s) on each radio link. The WTRU transmits control information associated with the E-DCH on an E-DCH Dedicated Physical Control Channel (E-DPCCH). There is at most one E-DPCCH on each radio link. The dedicated physical downlink channels needed for uplink transmissions are the F-DPCH, the E-DCH Relative Grant Channel (E-RGCH), the E-DCH Absolute Grant Channel (E-AGCH), and the E-DCH HARQ Indicator Channel (E-HICH). The WTRU receives power control commands on a DPCH or on an F-DPCH. The WTRU receives uplink relative grants from the serving and non-serving radio links over the associated E-RGCH configured by higher layer signaling for each serving and non-serving radio link. The WTRU receives absolute grants for E-DCH from the serving E-DCH cell on the E-AGCH configured by higher layer signaling. The WTRU receives HARQ A/N feedback on the E-HICH.

A cell may comprise a DL CC which may be linked to an UL CC. The DL CC-UL CC association may be based on the system information (SI) that is provided to the WTRU via broadcasting on the DL CC or via dedicated configuration signaling from the network. For example, when broadcasted on the DL CC, the WTRU may receive information regarding the uplink frequency and bandwidth of the linked UL CC as part of the system information element (e.g., when in RRC_IDLE for LTE, or when in idle/CELL_FACH for WCDMA, i.e. when the WTRU does not have a radio resource connection to the network).

When referred to hereafter, the term "primary cell" (PCell) means, without loss of generality, the cell operating on the primary frequency in which the WTRU may perform initial access to the system (e.g., the cell in which the WTRU may either perform the initial connection establishment procedure or the connection re-establishment procedure), or the cell indicated as the primary cell in the handover procedure. The PCell may correspond to a frequency indicated as part of the radio resource connection configuration procedure. Some functions may only be supported on the PCell. For example, the UL CC of the PCell may correspond to the CC whose physical uplink control channel resources are configured to carry the HARQ ACK/NACK feedback for a given WTRU. For example, in LTE, the WTRU uses the PCell to derive the parameters for the security functions and for upper layer system information such as non-access stratum (NAS) mobility information. Other functions that may be supported on the PCell DL include system information acquisition and change monitoring procedures on the BCCH, and paging. In terms of terminology, the primary serving cell in WCDMA may be similar as the PCell of LTE.

When referred to hereafter, the term "secondary cell" (SCell) means, without loss of generality, the cell operating on a secondary frequency which may be configured once a radio resource control connection is established and which may be used to provide additional radio resources. System information relevant for operation in the concerned SCell may be provided using dedicated signaling when the SCell is added to the WTRU's configuration. Although the parameters may have different values than those broadcasted on the downlink of the concerned SCell using the system information signaling, this information is hereafter referred to as SI of the concerned SCell regardless of the method used by the WTRU to acquire this information. For example, in terms of terminology, the secondary serving cell in WCDMA may be similar to the SCell of LTE.

When referred to hereafter, the terms "PCell DL" and "PCell UL" correspond to, without loss of generality, the DL CC and the UL CC of the PCell, respectively. Similarly, the terms "SCell DL" and "SCell UL" correspond to the DL CC and the UL CC of an SCell, respectively.

When referred to hereafter, the term "serving cell" includes, without loss of generality, a primary cell (e.g., a PCell) or a secondary cell (e.g., a SCell). More specifically, for a WTRU that is not configured with any SCell or that does not support operation on multiple component carriers (i.e., carrier aggregation), there is one serving cell comprising the PCell. For a WTRU that is configured with at least one SCell, the term "serving cells" includes the set of one or more cells comprising the PCell and all configured SCell(s).

When a WTRU is configured with at least one SCell, there may be one PCell DL and one PCell UL and, for each configured SCell, there may be one SCell DL and one SCell UL (if configured).

When referred to hereafter, the term "multi-mode WTRU" includes any mobile terminal supporting a plurality of RATs such as, but not limited to, any combination of GSM, WCDMA, HSPA, HSDPA, HSUPA, LTE, IEEE 802.11b/a/g/n, 802.16a/e, 802.20, cdma2000 1×, cdma2000 EV-DO. It should be noted that the embodiments described in greater detail hereafter may be explained with reference to HSPA and LTE as an example, but the embodiments may be extended to any combination of the RATs.

When referred to hereafter, the terms "primary RAT" and "anchor RAT" include the RAT for which at least one serving cell is configured as a primary cell from which at least one of the following functions is supported: the RRC connection is established and connected (in case a single RRC connection is used), security parameters are derived (in case a single security context is used), uplink resources are used to transmit uplink control information (UCI) (in case UCI is transmitted on a serving cell of a first RAT), and/or at least one serving cell is configured with uplink resources (in case uplink resources are configured in a first RAT). The primary RAT or the anchor RAT may be referred to as the "first RAT."

When referred to hereafter, the terms "secondary RAT" and "non-anchor RAT" include the RAT for which none of the configured serving cell(s) is for the primary RAT of the WTRU's configuration.

When referred to hereafter, the term "multi-RAT operation" includes an operation of the multi-mode WTRU that is simultaneously configured for operation with at least one component carrier, either a DL CC or an UL CC, on each of a plurality of RATs. The operation on different component carriers may occur either simultaneously or near-simultaneously in time. The operation on different RATs may be performed sequentially, including on the same component carrier.

A multi-mode WTRU supports simultaneous (or near-simultaneous) operation on multiple component carriers of a plurality of RATs. When configured to operate on one or more serving cells where at least one serving cell correspond to a first RAT and at least a second serving cell corresponds to a second RAT, the multi-mode WTRU may perform downlink and/or uplink transmissions using different RATs on different frequencies.

The uplink control information (UCI) in the embodiments described in greater detail hereafter may comprise at least HARQ A/N, channel state information components such as channel quality indicator (CQI), precoding matrix information (PMI), rank indication (RI), pre-coding control indication (PCI), a scheduling request (SR), an E-DCH transport format combination indicator (E-TFCI), a happy bit indicator, or a retransmission sequence number (RSN). An SR may be multiplexed with an HARQ A/N pertaining to the second RAT when the resulting UCI (including the SR) is transmitted over an uplink channel of the first RAT. For example, an SR and at least one HARQ A/N bit(s) pertaining to at least one downlink HSPA transmission(s) may be multiplexed together for transmission over, for example, an LTE PUCCH or PUSCH transmission. An E-TFCI, a happy bit indication and/or an RSN may be multiplexed with at least one bit of LTE UCI for an uplink transmission, either on an LTE PUCCH or PUSCH transmission or on an E-DPCCH transmission.

Embodiments described hereinafter may be applied alone or in any combination thereof. The embodiments may be applied to any configuration of multi-RAT operations. The embodiments may be applied to the case where the WTRU transmits using different RATs in same or different time intervals (e.g., time division operation on a transmission time interval (TTI) basis) on different frequencies, or the case where such transmissions are performed in the same frequency band.

Embodiments for physical layer procedures for transmitting UCI from one RAT over another RAT are disclosed hereafter.

In one embodiment, at least part of UCI corresponding to a component carrier of a second RAT may be transmitted on a component carrier of a first RAT, or vice versa. For example, for a WTRU operating in multiple RATs, an uplink control channel for UCI, (e.g., HARQ A/N, CQI, PMI, RI, PCI, etc.), may not be available for the second RAT, (e.g., no uplink resources are configured, no or insufficient uplink resources are allocated, no uplink resources are activated, or for any other reasons that may prevent the WTRU from performing transmissions on the control channel, such as insufficient available transmission power, invalid timing alignment, invalid pathloss reference, or radio link failure detected). In such cases, the WTRU may transmit at least part of the UCI corresponding to the second RAT on the uplink resources of the first RAT. Alternatively, the WTRU may be configured to transmit at least part of the UCI corresponding to the second RAT on uplink resources of the first RAT regardless of the availability of the uplink control channel for UCI on the second RAT.

The WTRU may be configured to use uplink resources of the first RAT to transmit at least part of the UCI corresponding to the second RAT. For example, the first RAT may be LTE and the second RAT may be WCDMA or HSDPA (or HSUPA), or vice versa. The uplink resources of the first RAT Of the first RAT is LTE) may use any LTE PUCCH format (e.g., LTE PUCCH format 1a, 1b, 2, 2a, 2b, or 3). A set of uplink resources of the first RAT may be used for channel selection on these resources, (e.g., HARQ A/N status is indicated by selecting one of the assigned uplink resources in addition to setting the HARQ A/N bits). The uplink resources for the feedback channel for the UCI on the first RAT may be a PUSCH, for example, in the PCell of the WTRU's LTE configuration. At least part of the UCI may be transmitted on a first uplink resource of the first RAT, and another part of the UCI may be transmitted on a second uplink resource of the first RAT. For example, the WTRU may transmit HARQ A/N bits on a PUCCH resource and CQI/PMI/RI bits on a PUSCH resource (either on the PCell or SCell).

The WTRU may prioritize a particular UCI over another in accordance with a priority rule. The UCI with a lower priority may be dropped and may not be transmitted.

The prioritization may be based on whether or not the UCI pertains to the primary RAT. For example, at least part of the UCI pertaining to the primary RAT may be given a higher priority than the UCI pertaining to the secondary RAT. Alternatively, at least part of the UCI pertaining to the secondary RAT may be given a higher priority than the UCI pertaining to the primary RAT. In another example, at least part of the UCI pertaining to LTE carriers and/or transmissions may have a higher priority over HSPA carriers or transmissions, or vice versa.

Alternatively, the prioritization may be based on whether or not the UCI pertains to a primary serving cell or to a secondary serving cell. For example, at least part of the UCI pertaining to a primary serving cell may have a higher priority than the UCI pertaining to a secondary serving cell. In combination with the rule above, at least part of the UCI of the primary cell of the primary RAT may have a higher priority than the UCI of other serving cells of the WTRU.

Alternatively, the prioritization may be based on configuration received from the network, (e.g., using RRC). For example, the WTRU may be configured such that the UCI for a particular type of signal may be prioritized over the UCI for another type of signal.

Alternatively, the prioritization may be based on the mode and/or type of UCI. For example, a WTRU may prioritize HARQ A/N and SR information over other types of UCI (e.g., CSI), and additionally, the WTRU may prioritize between CSI pertaining to different signals based on the type or mode of the CSI.

Alternatively, for UCI that is reported periodically, the prioritization may be based on the periodicity of reporting. For example, if CQI pertaining to the primary RAT and the secondary RAT are reported periodically and collide for the same uplink transmission (e.g., in the same subframe), the CQI reported with the larger periodicity may have a higher priority.

Alternatively, the prioritization may be based on what subframe within the radio frame the WTRU transmits the UCI, or what subframe within the radio frame the WTRU report the UCI for. The subframe pattern may be configured by higher layers, (e.g., RRC).

The WTRU may give an absolute priority to the transmission of UCI for the primary RAT.

Alternatively, the WTRU may give an absolute priority to the transmission of HARQ A/N information and/or SR. The WTRU may then prioritize the other UCI (e.g., CSI or CQI/PCI) of the primary RAT over the secondary RAT. Since transmissions on the secondary RAT may be performed using radio resources of a largely idle serving cell, the UCI for the primary RAT may be prioritized.

Alternatively, the WTRU may give an absolute priority to the transmission of HARQ A/N information and/or SR, and then prioritize the other UCI (e.g., CSI or CQI/PCI) of the secondary RAT over the primary RAT. Since mobility decisions (e.g., serving cells change) may be based on the channel quality of the primary RAT, one or more serving cells of the secondary RAT may be out of coverage or in bad channel conditions at any time. Moreover, because a WTRU may not be either configured or scheduled with UL transmissions on the secondary RAT, the network (e.g., an eNB or a NB) may not be aware of the channel conditions, the lack of coverage, or measurements performed by the WTRU. Therefore, prioritizing the UCI for the secondary RAT over the primary RAT may help the network in subsequent scheduling decisions (e.g., transmission power settings for downlink transmissions, beamforming, etc.), and monitoring the radio link or reconfiguration of the WTRU.

Alternatively, when the number of bits required to acknowledge the data received over the configured RATs exceeds the number of information bits that may be accommodated using a particular resource(s) dedicated for HARQ ACK/NACK, the WTRU may de-prioritize the transmission of the other UCI (e.g., CSI/CQI/PCI, etc.) and use the resources/slots assigned for the other UCI feedback to transmit the HARQ ACK/NACK bits.

Embodiments for multiplexing different types of LTE UCI and HSPA UCI (including SR) are disclosed hereafter. The multiplexed LTE UCI and HSPA UCI may be transmitted over either at least one LTE control channel (PUCCH or PUSCH, hereafter collectively PUxCH) or at least one HSPA control channel (e.g., DPCCH, HS-DPCCH, or E-DPCCH).

The embodiments described in greater detail hereafter are applicable for any methods by which the WTRU perform joint encoding either according to the conventional methods such as methods specified for LTE R10 with carrier aggregation or for 4C-HSPA or for 8C-HSPA, or alternatively any other method that may be defined specifically for joint encoding in the context of UCI transmission for multi-RAT operation.

Figure 2:
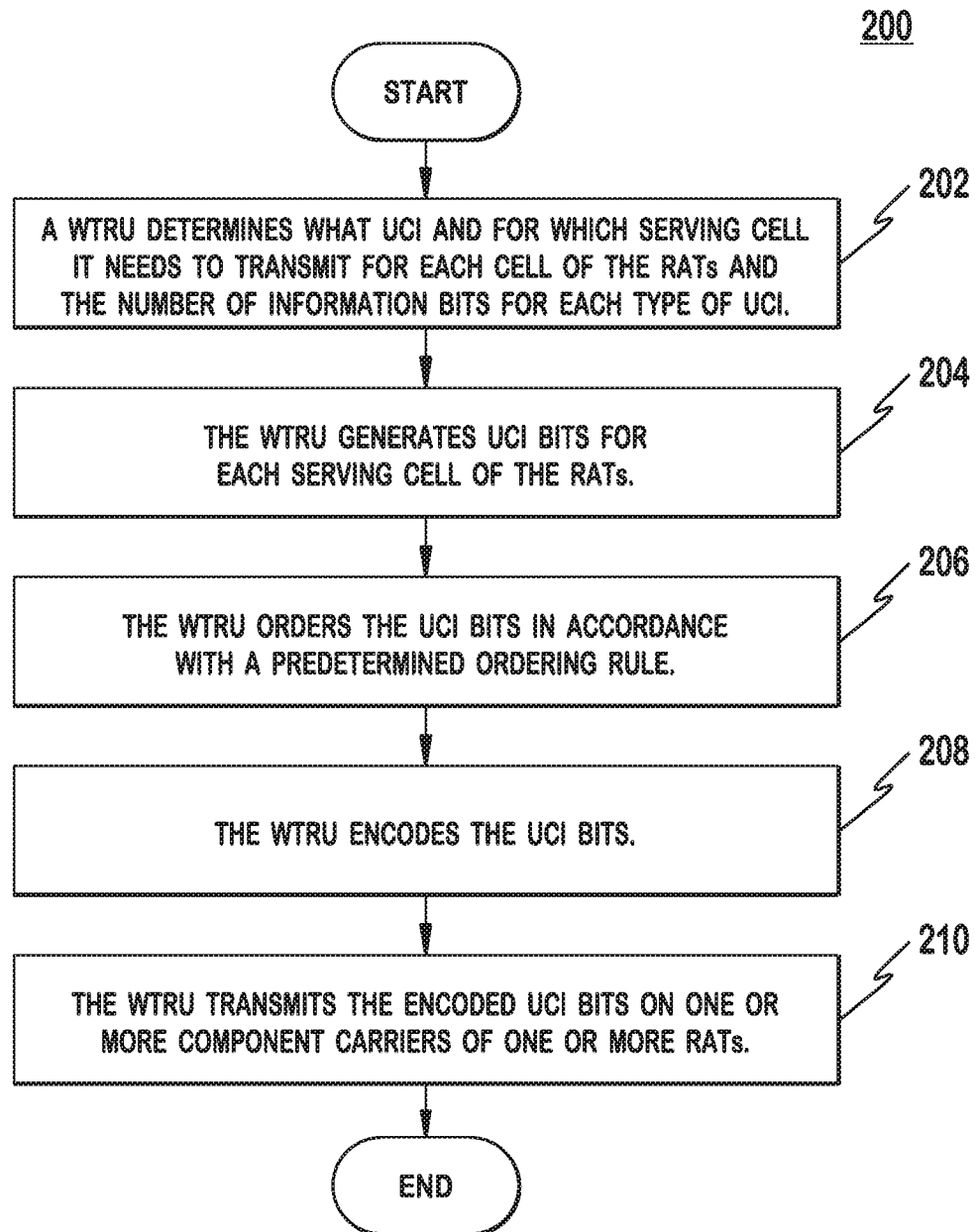
FIG. 2 is a flow diagram of an example process for multiplexing the LTE UCI and the HSPA UCI in accordance with one embodiment.

FIG. 2 is a flow diagram of an example process for multiplexing the LTE UCI and the HSPA UCI in accordance with one embodiment. A WTRU determines what UCI and for which serving cell it needs to transmit (e.g., the type of UCI) for each serving cell of the RATs, and may also determine the number of information bits for each type of UCI (202). The WTRU may apply UCI priority rules described above to match the number of bits that may be transmitted in a given uplink transmission on the given uplink feedback channel in a given subframe.

The WTRU may determine the number of UCI bits for each type of UCI for which at least one information bit is to be signaled by the uplink transmission based on at least one of the following: the number of concerned serving cell(s) which may be one of the number of configured serving cells of the WTRU's multi-RAT configuration or the number of active cells of the WTRU's multi-RAT configuration, the number of serving cells for which UCI is reported in this subframe, the transmission modes for each configured serving cells, configuration by higher layer signaling, (e.g., by RRC), whether or not SR is pending, the transmission time of the subframe, or whether or not UCI information bits may be spread across a plurality of uplink transmissions and, if so, how many transmissions may be used for the UCI transmission. The configured serving cells for the multi-mode WTRU include the primary and secondary cells on the primary RAT and either the primary and secondary cells on the secondary RAT if any is configured as such for the secondary RAT, or the configured serving cells of the secondary RAT.

Referring again to FIG. 2, once the WTRU has determined what UCI information may be included in the uplink transmission for a given subframe, the WTRU generates UCI bits for a serving cell(s) of the RATs (204), and may order the generated UCI bits for the serving cell(s) in accordance with a predetermined ordering rule (206). The order may be determined based on at least one of the following: the type of RAT carrying the uplink feedback transmission, the type of RAT of the serving cell for which the UCI bits pertain to, the type of the serving cell for which the UCI bits pertain to, the serving cell identifier assigned to a serving cell for which the UCI bits pertain to, and/or configuration order of the serving cells for which the UCI bits pertain to, etc. The order may be determined per type of UCI (e.g., applied separately to HARQ A/N bits and to CSI bits).

With respect to the type of RAT carrying the uplink feedback transmission, for example, in case LTE PUxCH is used, one or more SR bit may be included such that it is ordered to be either first, last, or at a predetermined position in the set of information bits to be encoded or transmitted.

With respect to the type of RAT of the serving cell for which the UCI bits pertain to, for example, UCI of a primary RAT may be ordered within the sequence of information bits before UCI of a secondary RAT. The UCI of the primary RAT and the UCI of the secondary RAT may be ordered within the UCI information bits of the primary and secondary RAT, respectively, according to rules described in greater detail hereafter.

With respect to the type of the serving cell for which the UCI bits pertain to, for example, UCI of one or more primary cells may be ordered before UCI of other serving cells.

With respect to the serving cell identifier assigned to a serving cell for which the UCI bits pertain to, UCI of different serving cells may be ordered based on, for example, increasing or decreasing value of their serving cell identifiers. The order of the cells may be configured by RRC either implicitly, for example, for a primary cell, (e.g., based on ordering of corresponding information element in the configuration sequence), and/or explicitly by serving cell identities, (e.g., for secondary cells, or serving cells of a specific RAT). The serving cell identities may be applicable to configured serving cells (per-WTRU numbering space) in which case the order may be in increasing or decreasing cell identifier value. The serving cell identifiers may be applicable to configured secondary cells (per SCell numbering space) in which case the order may be such that information for the primary cell(s) comes first followed by information for SCells in increasing or decreasing cell identifier value. The serving cell identifiers may be applicable to configured serving cells per configured RAT (per RAT numbering space) in which case the order may be such that information for the primary RAT comes first followed by information for the secondary RAT, where information for each RAT is ordered according to any of the previous alternatives.

With respect to configuration order of the serving cells for which the UCI bits pertain to, (i.e., the order in which the serving cells are configured for each RAT), for example, the order may be based on the sequence of each serving cell's respective information element within an RRC message that (re)configures the WTRU for multi-RAT operation. It may be applied for secondary serving cells of the WTRU's configuration.

For example, in ordering the UCI bits, SR bit(s) may be first, followed by HARQ A/N bits (ordered in an increasing or decreasing order of serving cells), and then followed by the remaining UCI information bits. For example, a WTRU may put SR bit(s) first, followed by HARQ A/N bits in an increasing or decreasing order of LTE serving cells, and then followed by HARQ A/N bits in an increasing or decreasing order of HSPA serving cells. Alternatively, the WTRU may put the SR bit(s) first, followed by UCI bits for the applicable serving cell(s) ordered in increasing (or alternatively decreasing) order of their serving cell identities. Alternatively, the WTRU may order the bits such that an SR is put first followed by UCI bits for the applicable LTE serving cell(s) ordered in increasing (alternatively decreasing) order of their serving cell identities, followed by UCI bits for the applicable HSPA serving cell(s) ordered in increasing (alternatively decreasing) configuration order.

Referring again to FIG. 2, once the WTRU determines the order of the UCI information, the UCI bits are then encoded (208), and the encoded UCI bits are then transmitted on one or more component carriers of one or more RATs (210).

In one embodiment, the UCI bits of the first RAT and the UCI bits of the second RAT may be first concatenated, and then jointly encoded before transmission. The WTRU may first concatenate the UCI bits of the first RAT (e.g., LTE UCI) and the UCI bits of the second RAT (e.g., HSPA UCI), and then jointly encode the concatenated bits before transmission over a feedback channel.

Encoding of the UCI bits may be performed on one or more subset of the ordered bits that may be performed per UCI type (e.g., HARQ A/N only, CSI only, or both). For example, the ordered UCI bits for the concerned serving cells may be first concatenated and then jointly encoded for transmission. Alternatively, the ordered UCI bits for the concerned serving cells of a given RAT may be first concatenated and then jointly encoded for transmission over different resources (in space, frequency, code or time).

The UCI bits may be first grouped for a pair of concerned serving cells of the same type, and then the bits for each group may be jointly encoded and the resulting codewords may be concatenated in time for transmission. For example, HARQ A/N bits of a pair of serving cells may be paired for encoding into a composite HARQ A/N. In case there is an odd number of serving cell(s) for a given composite HARQ A/N, the second bit may be set to discontinuous transmission (DTX). This may be performed in case of transmission over at least one HSPA uplink channel.

In another embodiment, UCI bits of a first RAT and UCI bits of a second RAT may be first jointly encoded per subset of serving cells and then the resulting bits for each group may be concatenated before transmission. Encoding of the UCI information may be performed based on one or more subset of the ordered bits that may be applied per UCI type (e.g., HARQ A/N only, CSI only, or both). The ordered UCI bits may be first grouped for a pair of concerned serving cells, and then the bits for each group may be jointly encoded and the resulting codewords may be concatenated in time.

For example, for HARQ feedback, the encoding for the composite HARQ A/N may be performed based on the conventional multi-cell HSPA rules (e.g., 4C-HSDPA), wherein a composite HARQ A/N is created per group of serving cells. Each composite HARQ A/N comprises jointly encoded bits for the group of serving cells. The composite HARQ A/N for each group of serving cells is concatenated and may be transmitted over a feedback channel, (e.g., the HS-DPCCH). The group may include two serving cells that may be configured to transmit with or without MIMO. The serving cells may comprise serving cells over multiple RATs. The order in which they are grouped and then concatenated is explained in greater detail hereafter. This may be performed in case of transmission over at least one HSPA uplink channel.

For example, HARQ A/N bits may be ordered in configuration sequence of the concerned serving cells and a composite HARQ A/N bits may be generated by pairing bits two-by-two in sequence. If the WTRU uses an HSPA uplink channel for HARQ A/N transmission, the WTRU may first order the HARQ A/N bits, for example, in accordance with the sequence of configuration of the serving cells, and then determine a composite HARQ A/N pair by grouping bits two-by-two in sequence, and each composite HARQ A/N may be jointly encoded using the applicable codeword. The WTRU may then concatenate the resulting codewords for transmission over the HSPA uplink channel. In case there is an odd number of serving cell(s) for a given composite HARQ A/N, the second bit may be set to DTX. HARQ A/N bits for the cells may first be grouped per RAT before the WTRU determines the composite HARQ A/N pair(s). This may be performed in case of transmission over at least one HSPA uplink channel.

For another example, CSI bits may be ordered in configuration sequence of the concerned serving cells (e.g., in accordance with the ordering rules disclosed above), and composite CSI may be generated by pairing the CSI bits two-by-two, (e.g., pairing in alternating order such as pairing CSI for cells 1 and 3, and paring CSI for cells 2 and 4, and so on, or alternatively paring first two cells and the next two cells, and so on). If a WTRU uses an HSPA uplink channel for CSI transmission, the WTRU may first order the CSI bits, for example, in accordance with the sequence of configuration of the serving cells, and CSI bit(s) may be paired two-by-two to form composite CSI, and the composite CSI may be jointly encoded and transmitted over the HSPA uplink channel in a time-division manner (e.g., a first composite CSI in a first TTI and a second composite CSI in the following TTI).

The WTRU may apply this method to one (or a subset of) type of UCI, such as the HARQ A/N information pertaining to downlink reception for LTE and/or HSPA, or to the CSI for at least one serving cell for LTE and/or HSPA. Once the UCI is encoded according to any of the embodiments described heretofor, the WTRU may transmit the resulting encoded information over an uplink feedback channel, such as PUxCH or HS-DPCCH or any other channel used to carry uplink feedback.

In another embodiment, UCI bits of a first RAT and UCI bits of a second RAT may be separately encoded and then concatenated before transmission over the uplink channel. The respective encoding (e.g., coding rates) may be performed such that each set of bits may meet a target error performance, for example, by ensuring that a similar transmission power may be achieved for each set of bits. The transmission of the different set of encoded bits may be performed on different resource locations on at least one uplink carrier used for transmission of uplink control information. For example, LTE UCI and HSPA UCI bits may be first separately encoded and then concatenated before transmission over a PUxCH. The respective coding rates and/or schemes applied to each of LTE and HSPA UCI bits may be adjusted in a way that results in the same transmission power for achieving the respective target error performance. For example, in case the HSPA UCI comprises a single information bit which is repeated over two LTE subframes, a higher coding rate may be utilized for this bit (such as no channel coding or a simple repetition) than for the LTE UCI bits.

LTE HARQ A/N information and/or HSPA HARQ A/N information applicable to more than one codeword may be bundled together to reduce the number of HARQ A/N information bits to transmit. For instance, a single bit may be transmitted to represent either a HARQ ACK or HARQ NACK for a bundle of codewords, where HARQ ACK is transmitted if all codewords of the bundle were received successfully and HARQ NACK is transmitted if at least one codeword of the bundle is not received successfully. The bundling may be applied to HARQ A/N information across codewords per carrier (or serving cell) for all or subsets of carriers. Alternatively, the bundling may be applied to codewords received across a predetermined set of carriers (or serving cells) or a subset thereof. Alternatively, the bundling may be applied to codewords received across a set of subframes, for instance consecutive LTE subframes of 1 ms. This may be useful in case the information needs to be transmitted over a single HSPA subframe of 2 ms, considering the limited capacity of an HS-DPCCH for the transmission of LTE UCI (along with the transmission of HSPA UCI). Alternatively, the bundling may be applied to HARQ A/N information pertaining to transport blocks received in a plurality of HSPA and/or LTE DL component carriers (the timing may be specified similarly as described in other embodiments). The bundling may be performed by AND operation over bits or summing the bits together (such as counting the number of ACKs) and modulo a certain value.

Embodiments for transmission of UCI pertaining to HSPA signals (HSPA UCI) over at least one LTE uplink physical channel such as PUCCH or PUSCH (collectively PUxCH) are explained in greater detail hereafter. Unless otherwise specified, the following embodiments apply to transmission over any of these channels. An HSPA signal may refer to a transmission over the HS-SCCH and/or the HS-PDSCH (at the physical layer). It may refer to a transmission over the HS-DSCH transport channel. The HSPA UCI may include ACK/NACK to downlink control information (such as HS-SCCH orders), or HARQ ACK/NACK, CSI, PCI, RI.

Figure 3:
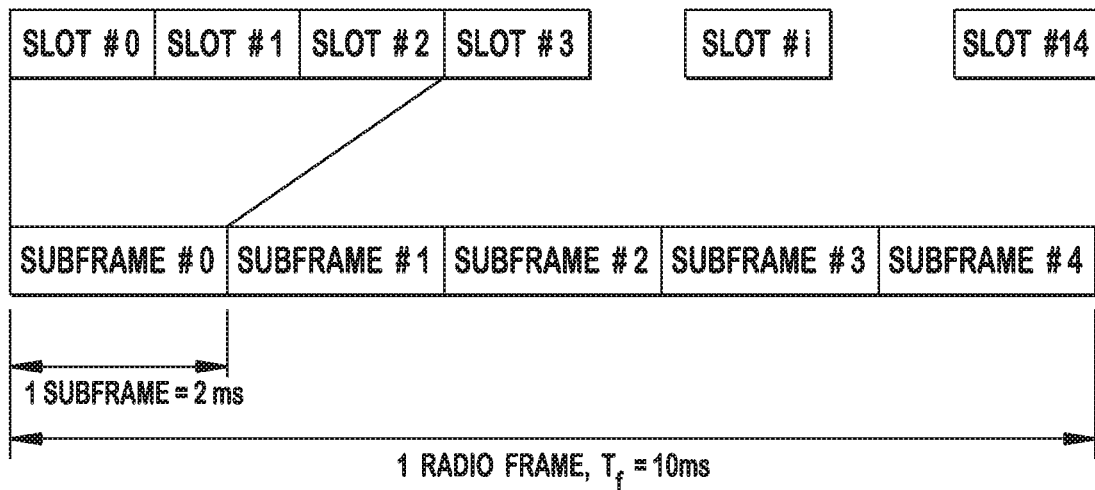
FIGS. 3 and 4 show frame structures of HSPA and LTE, respectively.
Figure 4:
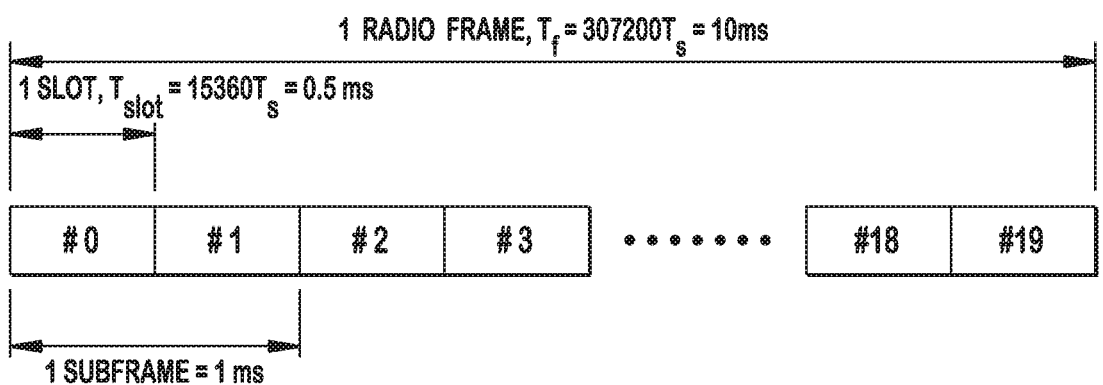

FIGS. 3 and 4 show frame structures of HSPA and LTE, respectively. In HSPA, each 10 ms radio frame comprises 5 equally sized subframes of 2 ms and each subframe comprises 3 time slots. In LTE, each 10 ms radio frame comprises 10 equally sized subframes of 1 ms, (i.e., the TTI for LTE is a 1 ms subframe). Considering that the TTI of the HS-DSCH is 2 ms, while the subframe duration of either PUCCH or PUSCH is 1 ms, timing relationships may be defined between the reception of HSPA signals from a DL CC and the transmission of corresponding UCI over an LTE physical channel.

In one embodiment, the HSPA UCI corresponding to a specific HSPA signal may be transmitted on a PUxCH over a single LTE subframe of 1 ms. In this case, such transmission may occur in subframe N+k, where k is a parameter of either fixed value or a value provided by higher layers, and N is the reference subframe of the HSPA signal in the LTE subframe numbering. The reference subframe N and the parameter k are described in greater detail hereafter.

In another embodiment, the HSPA UCI corresponding to a specific HSPA signal may be transmitted on a PUxCH over two LTE subframes of 1 ms, for example, in subframes N+k and N+k+1.

The reference subframe N may correspond to one of the subframe during which (or at the start of which) the HS-SCCH transmission starts, the subframe during which (or at the start of which) the HS-PDSCH transmission starts, the subframe during which (or at the start of which) the HS-DSCH transmission starts, the subframe during which (or at the end of which) the HS-SCCH transmission ends, the subframe during which the HS-DPSCH transmission ends, or the second subframe overlapping with at least one of the HS-SCCH, HS-PDSCH or HS-DSCH. Alternatively, the subframe N may be the first subframe at which starting boundary at least one of the HS-SCCH, HS-PDSCH and HS-DSCH transmission is ongoing.

For a transmission in a serving cell configured for LTE operation (LTE frequency division duplex (FDD) or time division duplex (TDD)), the value of k may be set to a fixed value of four (4) subframes. For LTE TDD, the value of k may correspond to the value of the HARQ timing for TDD.

In case the HSPA UCI is transmitted over a plurality of LTE subframes, the WTRU may repeat the UCI in each transmission, using one of the above timing relationships. Alternatively, the WTRU may send a subset of UCI in each transmission (e.g., a first subset in transmission at N+k, a second subset at N+k+1) using the above timing relationships for the reception of the concerned downlink transmissions (e.g., based on the reference subframe N). Either subset may be empty.

The UCI transmitted in the two subframes may be partitioned and encoded based on at least one of the following: the type of UCI, the carriers to which the UCI pertains, the codeword (or the transport block), a fixed target number of UCI bits per transmission, reception of explicit control signaling, encoding of the UCI, or higher layer configuration.

For example, the HARQ A/N may be transmitted in one subframe and CSI may be transmitted in the second subframe). In case there are at least two carriers configured for HSPA, the UCI pertaining to a first carrier or a first group of carriers may be transmitted in a first subframe and the UCI pertaining to a second carrier or a second group of carriers may be transmitted in a second subframe.

In case the UCI comprises at least HARQ A/N information for more than one HSPA codeword (or transport block), a subset of HARQ A/N information for a first subset of codewords may be transmitted in a first subframe and a subset of HARQ A/N information for a second subset may be transmitted in a second subframe. For instance, in case HARQ feedback is for two HSPA codewords transmitted from a single carrier, the feedback for the first and second codewords may be transmitted on the first and second subframes, respectively.

The WTRU may determine how to partition and/or encode the HSPA UCI considering the amount of UCI to be transmitted over LTE in each subframe. For example, the number of information bits for HARQ A/N of HSPA in each subframe may be set in a way that result in an equal total number of HARQ A/N bits to be transmitted in each subframe. Since the TTI in HSPA is 2 ms and the TTI in LTE is 1 ms, if the HSPA UCI is transmitted over LTE, the HSPA UCI may be split and spread over two subframes so that equal number of bits of the LTE and HSPA UCI bits may be transmitted in each subframe.

Reception of explicit control signaling may be used as a basis for partitioning the UCI. The control signaling may be derived from a characteristic of, or indication from, at least one control channel (such as HS-SCCH or PDCCH) used for scheduling of at least one codeword transmitted in HSPA carrier and/or LTE carrier. For example, a WTRU may transmit HARQ A/N information pertaining to the transmission of HSPA codewords in either subframe N+k or N+k+1 depending on an indication (field) decoded from the HS-SCCH used for scheduling said HSPA codewords.

Alternatively, a WTRU may transmit HARQ A/N information either in subframe N+k or N+k+1 depending on which one of specific configured HS-SCCH was used for the scheduling.

Alternatively, a WTRU may transmit HARQ A/N information pertaining to HSPA codeword(s) either in subframe N+k or N+k+1 depending on an indication (or the existence thereof) received in a PDCCH used for scheduling of LTE codewords in subframes N or N+1, respectively.

Alternatively, a WTRU may transmit HARQ A/N information pertaining to HSPA either in subframe N+k or N+k+1, depending on the TTI in which HS-SCCH was received. For example, if the HS-SCCH was received in an odd TTI then the WTRU may use N+k otherwise the WTRU may use N+k+1.

Using any of the examples above may allow the network to dynamically control which of a plurality of subframes may be used to transmit HSPA feedback.

The WTRU may apply different coding rates and/or schemes to the different UCI subsets in order to achieve the respective target error rates at the same transmission power. Information about the subset of UCI information to be transmitted in each subframe (for instance, the number of bits in each subframe) may be provided by higher layers.

With the schemes disclosed above, the transmission of UCI, in particular HARQ A/N for HSPA, may be performed by spreading in time the transmission of the information.

With respect to the selection of PUCCH or PUSCH for transmission of the HSPA UCI, the following embodiments may be used.

In one embodiment, the HSPA UCI may be transmitted on a PUCCH. This embodiment may be applied if the possibility of simultaneous PUCCH and PUSCH transmission is configured by higher layers.

In another embodiment, the HSPA UCI may be transmitted on a PUSCH This embodiment may be applied when an uplink assignment is available (otherwise either the HSPA UCI is transmitted on a PUCCH resource or it is not transmitted). This embodiment may be applied if the possibility of simultaneous PUCCH and PUSCH transmission is configured by higher layers, or if LTE UCI is transmitted on a PUCCH transmission, (e.g., HSPA UCI may be transmitted on a PUSCH resource when LTE UCI is transmitted on a PUSCH).

In another embodiment, the HSPA UCI may be transmitted over the same single physical channel and the same UL CC as the LTE UCI, according to rules applicable to the selection of physical uplink channel for the transmission of LTE UCI.

In another embodiment, a first part of the HSPA UCI may be transmitted in a first PUxCH and a second part of the HSPA UCI may be transmitted in a second PUxCH. For instance, the HARQ A/N part of HSPA UCI may be transmitted on the PUCCH while the CSI part of the HSPA UCI may be transmitted on the PUSCH.

Embodiments for transmission of HSPA UCI over a PUCCH are disclosed hereafter. The PUCCH may be of any format, such format 1a/b, format 2, or format 3. Hereafter, the term "corresponding PDCCH/PDSCH transmission" may refer to a PDCCH/PDSCH transmission for which the corresponding UCI (e.g., HARQ A/N) is transmitted in the concerned subframe, and the term "corresponding HS-SCCH transmission" may refer to an HS-SCCH or HS-DPSCH transmission for which the corresponding UCI (e.g., A/N or HARQ A/N) is transmitted in the concerned subframe.

The PUCCH resource used to transmit the HSPA UCI (and the LTE UCI) may be obtained according to at least one of the following methods.

In one embodiment, the PUCCH resource index may be received from the corresponding HS-SCCH transmission. This may be the case if no corresponding PDSCH transmission (or no corresponding PDSCH transmission for a secondary LTE serving cell) is received. The resource index may be either indicated explicitly in the received HS-SCCH, or derived implicitly based on which one of the configured HS-SCCHs was used for the transmission. For instance, if the WTRU is configured to receive the HS-DSCH using one out of four configured HS-SCCHs, the identity of the specific HS-SCCH that is used for a given HSPA transmission may be used in the determination of the PUCCH resource index. In case of an HS-SCCH-less transmission, the PUCCH resource index may be determined from a value configured by a higher layer. Alternatively, the specific combination of HS-SCCHs used for HSPA transmissions in multiple carriers may be used in deriving the PUCCH resource index. Alternatively, the TTI, the frame number, or the subframe number in which the HS-SCCH was received may be used in determining the PUCCH resource index.

In another embodiment, the PUCCH resource index may be received from the PDCCH of the corresponding LTE transmission. The index may be indicated explicitly from a field of the PDCCH, or be derived from another property of the PDCCH such as the position of its first control channel element. This may be the case if the corresponding PDSCH transmission for a secondary LTE serving cell is received. Alternatively, if the corresponding PDSCH transmission does not exist, the resource index may be obtained from a PDCCH encoded with a special format and indicating the transmission of one or more HSPA signal(s) from the HSPA DL component carrier(s). Alternatively, the resource index may be obtained from a PDCCH encoded with a format used to indicate the PUCCH resource index for the transmission of HSPA feedback associated with the simultaneous or concurrent HSPA transmissions scheduled over the HS-SCCH or received of the HS-PDSCH.

In another embodiment, the PUCCH resource index may be provided by a higher layer. This may be used in case no resource index may be signaled from either a PDCCH or HS-SCCH transmission.

In another embodiment, the PUCCH resource to use may be the same as the PUCCH resource used in the immediately preceding subframe. This embodiment may be used for the subframe N+k+1 in case where the HSPA UCI is transmitted over two subframes (N+k and N+k+1).

In another embodiment, the PUCCH resource used by the WTRU may be the same as the PUCCH resource used for the previous transmission of UCI, in any of the previous subframes. This may be used in case where no resource index is received from either a PDCCH or HS-SCCH transmission.

The coded bits of UCI information pertaining to HSPA and/or LTE carriers may be multiplexed over format 3 of PUCCH. In case the UCI is jointly encoded, the coded bits may be multiplexed using the same method used for the transmission of the UCI of LTE carriers. In case the UCI of HSPA and LTE carriers are separately encoded with different coding rates, the encoding may be such that the sum of coded bits may be equal to forty eight (48). Each coded bit may be spread over a number of symbols N on a certain time slot and sub-carrier. The number of symbols N on the second slot of the subframe may depend on whether a shortened PUCCH format is used (e.g., in case SRS is transmitted in the last symbol of the subframe).

In selecting the time slots and sub-carriers over which the UCI bits pertaining to an HSPA carrier or an LTE carrier are transmitted, the time slot with the lesser number of symbols N may be selected for coded bits encoded with the higher code rate. This may allow for balancing the error performance in case the two time slots do not have the same number of symbols. Alternatively, one time slot may be selected for one fraction of the coded bits that have been encoded for either HSPA or LTE UCI, and the second time slot may be selected for the remaining coded bits encoded for the HSPA or LTE, wherein the fraction may be one half. This method utilizes time diversity within coded bits. Alternatively, within a certain time slot, a subset of sub-carriers separated by units of 12/M may be selected for coded bits that have been encoded for either HSPA or LTE UCI, where M is the number of such coded bits that are mapped to this time slot. This may utilize frequency diversity within coded bits. Alternatively, different subsets of sub-carriers may be selected between the two time slots for coded bits that have been encoded for either HSPA or LTE UCI.

UCI information pertaining to HSPA and/or LTE carriers may be multiplexed over PUCCH format 2. HARQ A/N bits pertaining to an HSPA DL carrier transmission, or bits obtained from bundling between HARQ A/N bits pertaining to both HSPA and LTE DL carrier transmissions may be multiplexed with CSI information of at least one HSPA DL carrier or LTE DL carrier using the same method as for the multiplexing of HARQ A/N and CSI bits over PUCCH format 2a or 2b for an LTE carrier.

UCI information pertaining to HSPA and/or LTE carriers may be multiplexed over PUCCH format 1/1a/1b.

In one embodiment, in case of aggregating one HSPA DL carrier with one LTE DL carrier, up to two HARQ A/N bits pertaining to the HSPA DL transmission in at least one sub-frame and up to two HARQ A/N bits pertaining to the LTE DL transmission in at least one sub-frame may be combined to select a PUCCH format 1b resource and a modulation symbol according to a channel selection codebook.

In another embodiment, in case of aggregating at least one HSPA DL carrier with at least one LTE DL carrier, a positive SR may be signaled along with HARQ A/N information pertaining to at least one HSPA DL and/or at least one LTE DL transmission. This may comprise first bundling HARQ A/N bits pertaining to these transmissions, and then modulating a PUCCH signal of format 1/1a/1b based on the outcome of the bundling operation (such as mapping to a constellation point). The PUCCH resource may be obtained from a higher layer or assigned dynamically.

UCI pertaining to LTE signals (LTE UCI) from at least one carrier may be transmitted over at least one HSPA uplink physical channel such as the HS-DPCCH, the E-DPCCH, or the DPCCH. Embodiments described hereafter may apply to transmission over any of these channels, which may be collectively referred to as "HSPA uplink physical channel." An LTE signal may refer to the reception by the WTRU of a transmission over the PDCCH channel and/or the PDSCH channel (at the physical layer). It may refer to the reception by the WTRU of a transmission over the DL-SCH transport channel.

The UCI feedback for LTE and/or HSPA signals may be sent over the HS-PDCCH using slot format 0 or slot format 1. Alternatively, a new slot format may be used to allow more information bits to be transmitted over the HS-DPCCH, wherein a new spreading factor, (e.g., 64), may be used.

The slot format and channel coding may be determined based on at least one of the following: total number of serving cells configured across all RATs or activated serving cells, the configured transmission mode for each concerned serving cell, whether or not at least one serving cell is configured for a secondary RAT, the number of cells configured (or active) for the secondary RAT, or explicit configuration by the network.

Embodiments for multiplexing the coded bits of UCI information pertaining to HSPA and/or LTE carriers over an HSPA feedback channel are disclosed in greater detail hereafter.

In one embodiment, an HARQ-ACK message may be created per group of serving cells across all configured RATs. An HARQ-ACK message (or composite HARQ-ACK or codeword) may be formed by jointly encoding the HARQ-ACK states for each serving cells belonging to the group (configured with or without MIMO). The group may comprise a pair of serving cells that belong to the same RAT or to different RATs.

Each group and logical association of the serving cells to the HARQ-ACK messages may be determined by pairing the primary and secondary serving cells in order. The order of the serving cells across both RATs may be determined according to the rules disclosed above. In case there is an odd number of serving cell(s), the given HARQ-ACK message may comprise the HARQ acknowledgment of a serving cell and a DTX message in that order.

The CSI report may be formed according to the following rules. In each HS-DPCCH subframe the WTRU may be allowed to transmit the CSI of two serving cells. The CQI or CQI/PCI/RI for each serving cell may be independently encoded and concatenated to form a composite CSI. The logical association of the serving cells to the CSI report may be determined by pairing odd and even serving cells across the RATs in order as described herein.

A CSI report may be encoded individually per cell and transmitted individually per cell. This may be used if the LTE CSI report requires more bits than an HSPA CSI report requires. An LTE CSI report may be transmitted individually in an HS-DPCCH subframe, but the HSPA feedback may be transmitted in pairs. In each HS-DPCCH subframe the WTRU may be allowed to transmit CSI of up to four cells, (e.g., if a new HS-DPCCH slot format is introduced).

In one embodiment, the UCI feedback over an HSPA channels may be transmitted using the HS-DPCCH slot format 0 (i.e., spreading factor 256) or slot format 1 (i.e., spreading factor 128). A slot format 0 may be used, for example, when the WTRU is configured with one HSPA serving cell and one LTE serving cell. Alternatively, the slot format 0 and the associated coding for three cells may be used when a total of three serving cells without MIMO are configured across all RATs. Otherwise, the WTRU may use the HS-DPCCH slot format 1 to transmit the feedback.

For example, the HARQ-ACK messages may be concatenated and transmitted in the first slot, and the CSI reports may be transmitted in the second and third slot of the HS-DPCCH. Given that the WTRU may transmit up to two CSI reports in an HS-DPCCH sub-frame, the reporting for different pairs of serving cells may be transmitted in different sub-frames, which may or may not be consecutive. The cycle or periodicity of the CSI messages may be independently configured for each group. Alternatively, one cycle may be configured. In this case, the WTRU may transmit the CSI feedback of each group in order in consecutive sub-frames or consecutively in group order in predetermined sub-frames.

The power used for each composite HARQ-ACK may be determined and adjusted to result in the same transmission power for achieving the respective target error performance. The offsets for ACK, NACK, and/or CQI may be separately configured for each target RAT.

Alternatively, the HARQ-ACK information may be transmitted in one or more slots of the HS-DPCCH. If the number of bits to transmit the HARQ-ACK for the configured cells is greater than the number of bits that may be acknowledged with an HS-DPCCH slot format, the WTRU may use the slots reserved for CQI/PCI reporting (e.g., slot 2 and/or slot 3). The coding of the information for slot 2 or 3 may follow the same rules as the coding for slot 1. The group of HARQ-ACK that is transmitted over slot 2 or 3 may correspond to the group of serving cells in the order of configuration. Alternatively, a different rule may be defined wherein the HSPA HARQ-ACKs are grouped, coded, and concatenated on the first slot or a predefined slot, and the LTE HARQ-ACKs are grouped, coded, and concatenated on a second or predefined slot of the HS-DPCCH. In this embodiment, the HARQ-ACK may have priority over the CSI feedback.

The WTRU may transmit over one or more slots of the HS-DPCCH. If the WTRU detects an HS-SCCH, HS-DPSCH, PDCCH, or PDSCH transmission addressed to the WTRU, the WTRU may use the new HS-DPCCH to transmit HARQ-ACK and may not include the CSI information. Otherwise, the WTRU may send the CSI information using the normal coding if triggered on the corresponding TTI. If one RAT transmitted, the WTRU may use the first slot. Otherwise, the WTRU may use more than one slot of the HS-DPCCH.

The set of sub-frames in which the WTRU uses the normal HS-DPCCH slots for CSI feedback or vice versa may be preconfigured. A new information bit or codeword may explicitly indicate to the network that this HS-DPCCH includes HARQ-ACK information over the full HS-PDCCH and no CSI. For example, the WTRU may use the special codeword or information to indicate to the network on the first slot that the next two slots are used for HARQ-ACK information. If more than one composite HARQ-ACK is transmitted and configured the WTRU may use the special reserved code over both composite HARQ-ACKs or over just one of them. Otherwise, if one slot is used for HARQ-ACK and the other two are used for CSI, the WTRU may use any of the existing codewords or DTX the slot.

In another embodiment, two HS-DPCCH channelization codes may be used to transmit LTE UCI and HSPA UCI. For example, depending on the number of serving cells configured for each carrier, the feedback for the primary RAT may be sent on a first HS-DPCCH channelization code and the feedback for the secondary RAT may be sent on a second HS-DPCCH channelization code. The coding of the bits and the choice of the slot format to use may depend on the number of serving cells configured and active and the transmission mode configured for each RAT, as is used for a single HS-DPCCH. Alternatively, the grouping and encoding of feedback may be performed in accordance with any of the embodiments described heretofor (e.g., serving cells are paired), and the UCI information of the first pairs of serving cells may be sent on a first HS-DPCCH and the UCI information of the other pairs may be sent over a second HS-DPCCH in case where more than X serving cells across all RATs are configured, where X is the maximum number of serving cells with or without MIMO that may be acknowledged in a single HS-DPCCH.

In another embodiment, the E-DPDCH code/slot space may be used to transmit the UCI. For example, the UCI of any of the configured RATs may be transmitted over the E-DPDCH. Alternatively, the LTE UCI may be transmitted over the E-DPDCH. In this example, the HSPA feedback may be provided over the HS-DPCCH and the LTE feedback may be provided over the E-DPDCH. Alternatively, the feedback may be provided over an MAC control element (CE) or an MAC PDU. Alternatively, the E-DPDCH or the MAC CE may be used to report aperiodic CSI reports, whereas the HS-DPCCH may be used to transmit the periodic CSI reports.

A WTRU may receive a request for aperiodic CSI reporting for HSPA and/or LTE via an LTE control channel. LTE standards define the functionality for aperiodic CSI reporting. In one embodiment, a request for aperiodic CSI reporting may be transmitted over LTE, (i.e., the PDCCH), for at least one of serving cells. The requested serving cell(s) may correspond to either LTE serving cell(s) or HSPA serving cell(s), or to one or more serving cells of both HSPA and LTE. This may allow an LTE network to request a CSI report for any of the serving cells.

In another embodiment, a request for aperiodic CSI report may be transmitted over an HSPA physical channel, such as an HS-SCCH. A new HS-SCCH format or order may be defined and used for aperiodic CSI request for LTE and/or HSPA serving cells.

Upon reception of such request, the WTRU may create the report and send it using one or a combination of the following schemes. The WTRU may transmit the report over a MAC CE. Alternatively, the WTRU may transmit the report over an HS-DPCCH, wherein the subframe in which the CSI is reported corresponds to the first subframe in N+k in which the CSI of the corresponding serving cell is allowed to be reported, and where N is the subframe in which the request is received and k is a predefined or network configured value. Alternatively, the subframe that the CSI is reported may be explicitly indicated in the request. Alternatively, the WTRU may transmit the report on the E-DPDCH. The code and space over which to transmit the report may be pre-configured, explicitly signaled on the PDCCH or HS-SCCH, or implicitly determined. The aperiodic LTE and HSPA CSI may be appended together and sent over the HSPA uplink channel(s) or the LTE channel(s).

Considering that the TTI of the DL-SCH in LTE is 1 ms, while the subframe duration of an HSPA uplink physical channel such as the HS-DPCCH is 2 ms, timing relationships between the reception of LTE signals from a DL CC and the transmission of corresponding UCI over an HSPA uplink physical channel are described in greater detail hereafter.

In one embodiment, the LTE UCI, corresponding to LTE signals from two consecutive LTE subframes of 1 ms, may be transmitted in a single 2 ms subframe of the HS-DPCCH. For example, the LTE UCI transmitted in subframe N (in the HSPA uplink subframe numbering) may correspond to LTE signals transmitted at the start or during subframe N-k and N-k+1, where k is a parameter of either fixed value or a value provided by a higher layer. Alternatively, the subframe N may be the subframe at which starting boundary of the transmission of the LTE signal(s) is ongoing.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented by a wireless transmit/receive unit (WTRU) for transmitting channel state information (CSI) reports, the method comprising:

determining a priority for each of a plurality of CSI reports based on a type of the respective CSI report and a cell associated with the respective CSI report;

determining a set of CSI reports from the plurality of CSI reports for transmission, wherein the set of CSI reports for transmission excludes at least one CSI report of the plurality of CSI reports based on the determined priority; and transmitting the set of CSI reports in one or more physical uplink control channel (PUCCH) transmissions.

2. The method of claim 1, wherein the priority of each CSI report of the plurality of CSI reports is based on an index of the cell associated with the respective CSI report.

3. The method of claim 1, wherein the transmitting is performed using a plurality of radio access technologies (RATs).

4. The method of claim 1, wherein the priority for each CSI report of the plurality of CSI reports is based on a mode of reporting the respective CSI report.

5. The method of claim 4, wherein the mode of each CSI report of the plurality of CSI reports is aperiodic reporting or periodic reporting.

6. The method of claim 1, wherein the type of each CSI report of the plurality of CSI reports is based on contents of the respective CSI report.

7. A wireless transmit/receive unit (WTRU) for transmitting channel state information (CSI) reports, the WTRU comprising:

a processor operatively connected to a transmitter, wherein the processor is configured to determine a priority for each of a plurality of CSI reports based on a type of the respective CSI report and a cell associated with each CSI;

the processor further configured to determine a set of CSI reports from the plurality of CSI reports for transmission, wherein the set of CSI reports for transmission excludes at least one CSI report of the plurality of CSI reports based on the determined priority; and the transmitter configured to transmit the set of CSI reports in one or more physical uplink control channel (PUCCH) transmissions.

8. The WTRU of claim 7, wherein the priority of each CSI report of the plurality of CSI reports is based on an index of the cell associated with the respective CSI report.

9. The WTRU of claim 7, wherein the WTRU is configured to use a plurality of radio access technologies (RATs).

10. The WTRU of claim 7, wherein the priority for each CSI report of the plurality of CSI reports is further based on a mode of reporting the respective CSI report.

11. The WTRU of claim 10, wherein the mode of each CSI report of the plurality of SCI reports is aperiodic reporting or periodic reporting.

12. The WTRU of claim 7, wherein the type of each CSI report of the plurality of CSI reports is based on contents of the respective CSI report.

13. The method of claim 1, wherein the set of CSI reports are transmitted with a HARQ response.

14. The method of claim 7, wherein the set of CSI reports are transmitted with a HARQ response.

* * * * *